Sept. 13, 1927. 1,642,233
G. G. ELLIOTT
AUTOMOBILE FENDER
Filed Dec. 9, 1926     2 Sheets-Sheet 2
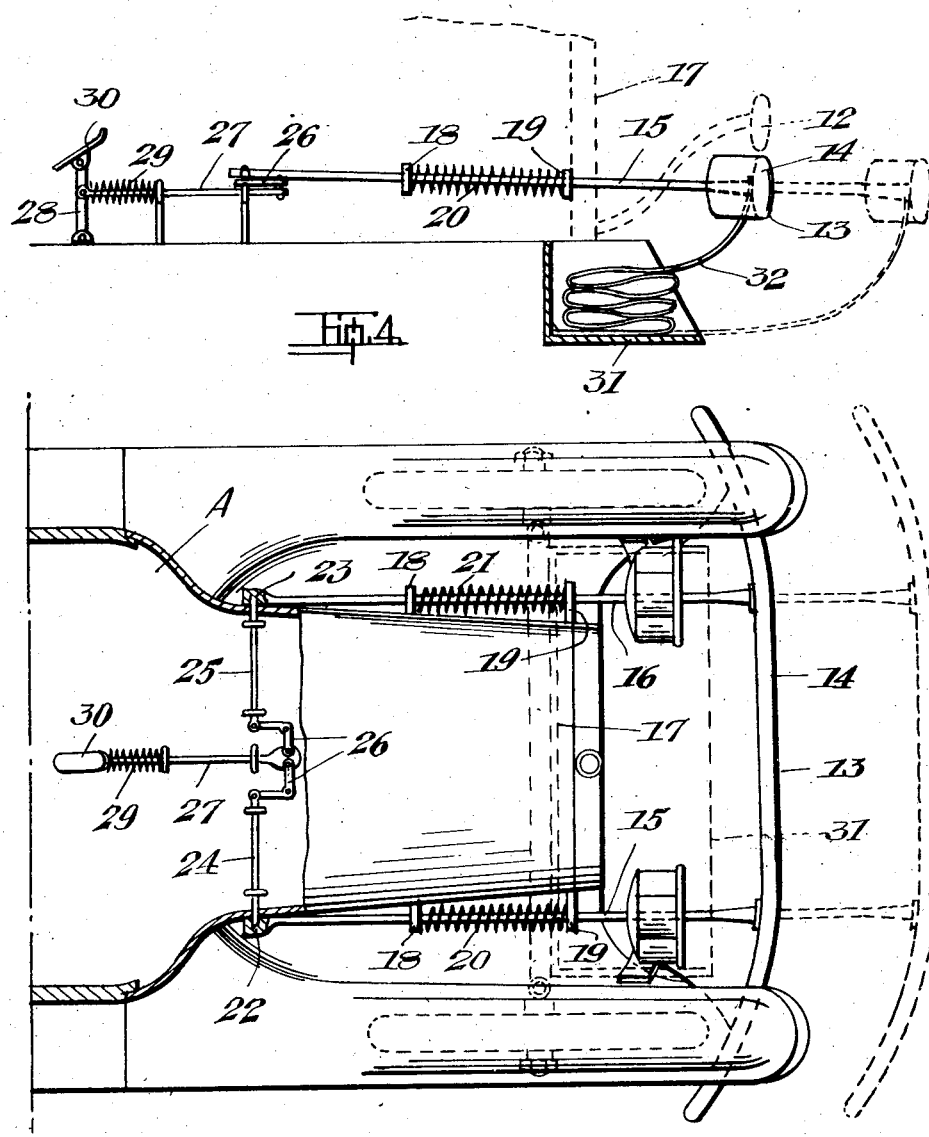

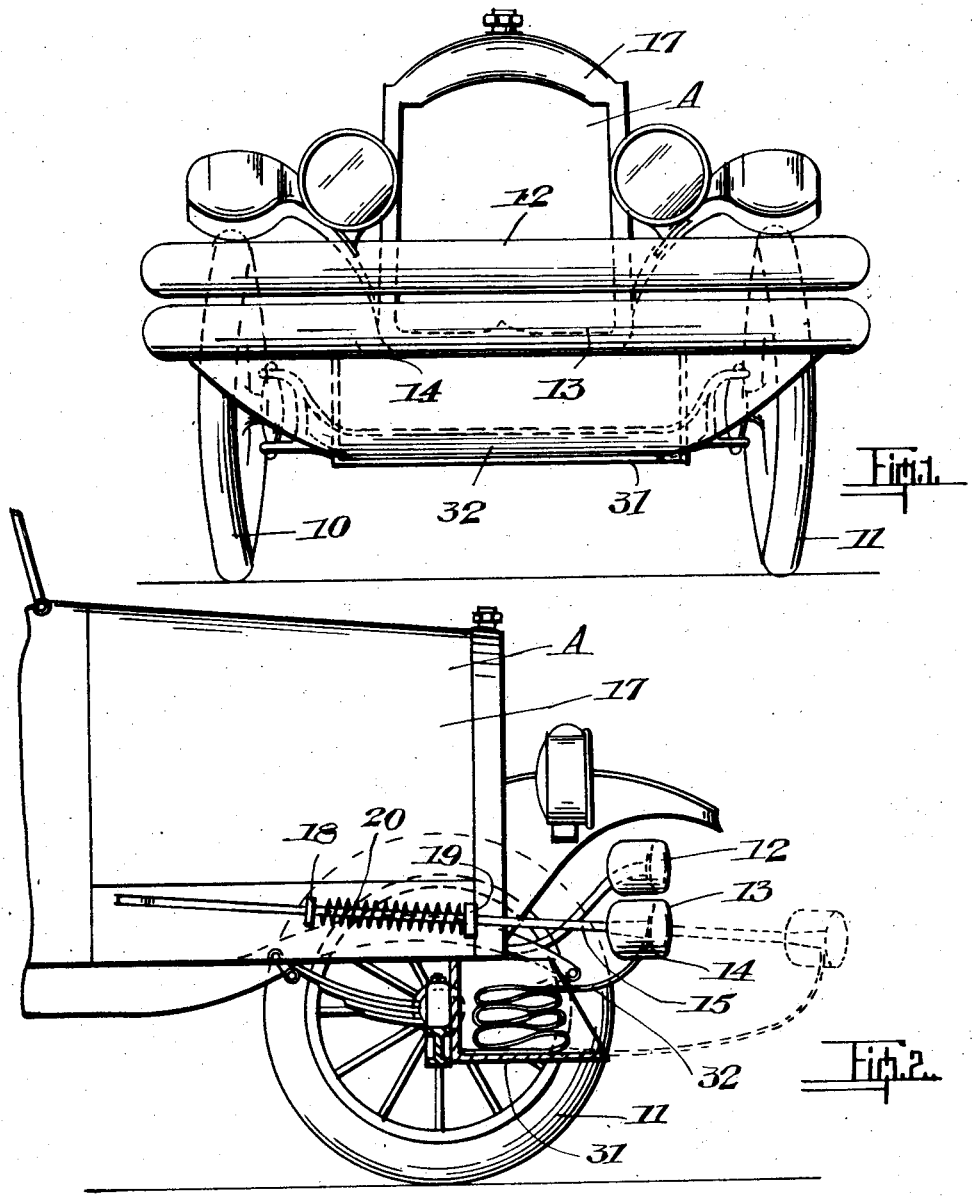

Patented Sept. 13, 1927.

1,642,233

UNITED STATES PATENT OFFICE.

GEORGE GUNN ELLIOTT, OF STE. ANNE DE BELLEVUE, QUEBEC, CANADA.

AUTOMOBILE FENDER.

Application filed December 9, 1926. Serial No. 153,710.

This invention relates to improvements in fenders for automobiles and the like, and the objects of the invention are to provide a fender for automobiles and street cars and the like that will prevent pedestrians being caught beneath the wheels of the vehicles in motion.

Still further objects are the provision of a spring-actuated fender of this character in combination with means in the form of an expansible bag or the like for automatically catching and carrying an individual knocked down by a street car or automobile.

Still further objects are the provision of an efficient device of this character that can be economically manufactured and fitted to automobiles and street railway cars without altering their construction and in which the several parts will more satisfactorily perform the various functions required of them.

With the foregoing and other objects in view, the invention consists essentially in the novel construction and arrangement of parts described in the present specification and illustrated by the accompanying drawings that form a part of the same.

Referring now to the drawings, in which like characters of reference indicate corresponding parts in each figure:

Figure 1 is a front elevation of an automobile fitted with my improved fender and receiving means.

Figure 2 is a side elevation.

Figure 3 is a top plan view.

Figure 4 is a plan view of the fender mechanism showing in dotted lines the outward movement thereof.

In the drawings, in which an embodiment of my invention is shown fitted to an automobile, A designates the automobile mounted in the usual well-known manner and provided with front wheels 10 and 11 and bumper 12. Below the bumper 12 is arranged my improved fender 13 comprising the bumper or suitable fending bar 14 fixedly secured to supporting bars 15 and 16 in spaced relationship to one another and extending at right angles to the fender and inwardly on each side of the radiator 17. These bars, substantially midway of their length, are provided with spaced stops or blocks 18 and 19 between which are wound coil actuating springs 20 and 21, the inner ends of the bars being adapted to engage at 22 and 23 with cross bars 24 and 25 centrally and pivotally connected to one another by bell-cranks 26 operable by an arm 27 pivotally connected thereto and pivotally connected at its other end to a vertical arm 28 in turn pivotally mounted in the bottom of the vehicle. The arm 27 is spring-actuated by means of a coil spring 29, while the arm or rod 28 is provided with a foot rest or pedal 30.

Beneath the fender 14 and secured on a tray or bracket member 31 on the front of the machine is a collapsible bag 32 connected to the bars 15 and 16 and to the supporting bracket at the other end so that when the fender is shot out the bag is opened to receive the individual or otherwise hit and knocked down by the fender.

In operation, when the foot rest 30 is pressed the arm 27 is moved inwardly to release, through bell-cranks 26, the arms or bars 24 and 25 from engagement with the fender rod supports 15 and 16 thereby allowing the fender to shoot out, carrying with it the receiving bag underneath. When the occasion for using the fender is passed it is manually shoved inwardly from the front until the rods 15 and 16 engage with the bars 24 and 25 to hold it in collapsible position.

It will thus be seen that not only will my fender act as a preventative of accidents by moving people out of the way of the vehicle, but it will also, in emergency, cause an individual to fall and be received into the bag, thus obviating all possibility of being run over by the wheels of the vehicle.

As many changes could be made in the above construction, and many apparently widely different embodiments of my invention, within the scope of the claims, constructed without departing from the spirit or scope thereof, it is intended that all matter contained in the accompanying specification and drawings shall be interpreted as illustrative and not in a limiting sense.

What I claim as my invention is:

1. A fender and pick up for automobiles and the like comprising a fender bar, spring-actuated supporting rods for said bar, and recesses formed on the inner ends of said rods adapted to engage with bell-crank connecting cross-bars to retain the fender in collapsed position, spring-actuated lever means connected to said bell-cranks, and means for operating the lever from the driver's seat whereby the cross-bars are released from engagement with said supporting rods, coil spring wound on said rods to automatically move the rods outwardly when released, bag receiving means carried by the fender adapted to open on the fender being protruded.

2. Combined fender and pick up means of the character described comprising a fender bar provided with spring-actuated supporting rods, and adapted to engage at their inner ends with bell-crank operated cross-bars whereby the rods and the fender are retained in withdrawn position, means for operating the cross-bars to release the fender comprising a lever arm operatively connected to a pivotally mounted supporting standard at the other end, and foot rest means for the supporting standard whereby, on the latter being pressed downwardly, the bell-cranks are operated to release the cross-bars to permit outward movement of the fender, spring-actuating means for said lever, and expansible bag means fixedly secured to the fender at one end, and bracket means on the vehicle for supporting the other end of said bag.

3. A fender and pick up of the character described for automobiles, street cars and the like comprising a fender bar having spring-actuated supporting rods adapted to engage with retaining means in the vehicle, said retaining means comprising a pair of rods adapted at one end to engage with said retaining means, and connected at the inner ends by bell-cranks, and spring-actuated arm means connecting the bell-cranks with a pivotally mounted lever, and means for operating said lever from the driver's seat, a supporting bracket on the front of the vehicle, a receiving bag supported on said bracket and having its other end connected to the fender bar whereby, on the latter being released and automatically shooting out, the receiving bag is opened and whereby, on the fender assuming a normal position, the receiving bag is foldably supported on said bracket.

In witness whereof I have hereunto set my hand.

GEORGE GUNN ELLIOTT.